May 1, 1962    R. A. GAYNES ET AL    3,032,438
HIGH AND LOW TEMPERATURE PRESSURE-SENSITIVE ADHESIVE TAPE
Filed Nov. 3, 1958
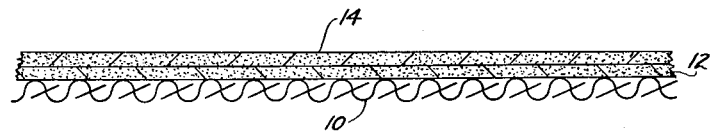
INVENTORS
Raymond A. Gaynes
Robert C. Schnabel
by- Ooms, McDougall Williams-Hersh
ATTY.

HIGH AND LOW TEMPERATURE PRESSURE-SENSITIVE ADHESIVE TAPE

Raymond A. Gaynes, Oak Lawn, and Robert C. Schnabel, Arlington Heights, Ill., assignors to Mystik Adhesive Products, Inc., Northfield, Ill., a corporation of Illinois
Filed Nov. 3, 1958, Ser. No. 771,390
21 Claims. (Cl. 117—76)

This invention relates to the manufacture of a pressure-sensitive adhesive product, and more particularly to an improved pressure-sensitive adhesive product structure and to methods and materials for the manufacture thereof. In the further description of this invention, pressure-sensitive adhesive products will be exemplified as tapes.

In many industrial applications such, for example, as in the manufacture of electric motors and generators and in the fabrication of heater ducts for aircraft which undergo severe and extreme temperature differentials, a very definite need exists for pressure-sensitive adhesive tape which will retain its flexibility and adhesive properties under extreme cold, such as is experienced at a temperature of about —110° F., and which will likewise have good cohesion and adhesion properties under extreme heat, such as is experienced at temperatures of about 550° F., and which will further resist charring of both the adhesive and the backing when subjected to these temperatures.

Up to now, a number of pressure-sensitive adhesive tapes (hereinafter called "tapes") have been manufactured from backing sheets having a pressure-sensitive adhesive applied to one of their surfaces. Heretofore, the pressure sensitive adhesive is usually formulated of a rubber-resin system such as resins or resin esters in combination with an elastomer of the type including natural rubber and synthetic elastomeric polymers. The backing sheets employed are generally formed from a fabric, such as woven cotton textiles and the like, or from synthetic resinous films such as polyvinyl chloride, nitrocellulose and the like, although the backing sheets for certain special purpose tapes are formed from paper, non-woven fabrics having interbonding fibers, and thin metallic films such as tin, lead, aluminum foil and the like. Generally, the backings are large sheets coated with pressure-sensitive adhesive and thereafter cut into strips or bands of a preselected width and rolled about a spool for distribution and sale.

While these tapes find great use and possess excellent properties for many diverse applications, the materials used in the backing strips in combination with the rubber-resin adhesives are not sufficiently inert to permit the tapes to be used for applications employing severe temperature conditions, that is, below about 32° F. or in excess of about 200° F. The tapes employing rubber-resin adhesives are further unsuited for applications employing severe temperature conditions because these adhesives become embrittled and lose their adhesiveness at extremely low temperatures and their cohesive strength is materially reduced when tapes employing them are subjected to temperatures in excess of room temperature.

The present invention is predicated upon the discovery that the desired stability under widely varying and frequently severe temperature conditions can be obtained by employing a backing of continuous yarn Fiberglas cloth successively coated with layers of two specially formulated adhesive materials, hereinafter fully described, which contain organosilicon polymers among their essential ingredients.

TABLE I

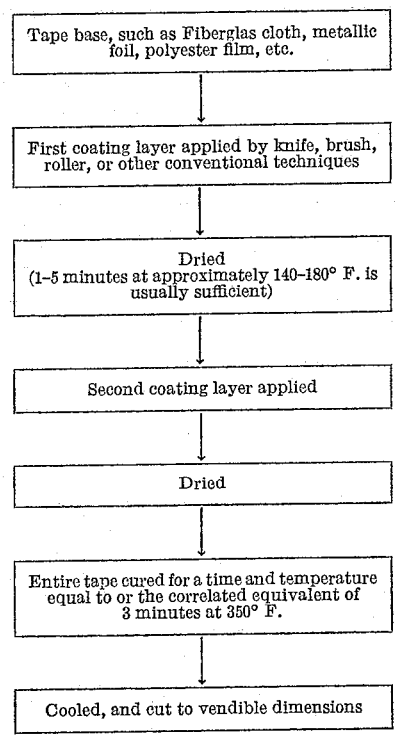

Accordingly, it is a prime object of the present invention to produce and to provide a method and materials for producing a pressure-sensitive adhesive tape which retains flexibility and good adhesion at temperatures of —110° F. and has good cohesion and adhesion properties at temperatures of 550° F. and which may be used for a variety of extreme thermal applications for which no single tape has heretofore been known.

It is a more specific object of the present invention to produce a pressure-sensitive adhesive tape which is formed with a backing of continuous yarn Fiberglas cloth having high tensile strength and which resists high temperature degradation while remaining flexible at extremely low temperatures of the order of —110° F. to 550° F.

A still further object of the present invention is to provide an improved pressure-sensitive adhesive product characterized by its adaptability for use under widely diverse thermal conditions and its ability to retain flexibility, thermal stability and good adhesion properties over a temperature range extending from about —110° F. to 550° F. and formed of a thermally stable backing successively coated with two specially formulated silicone adhesive materials, respectively containing benzoyl peroxide and tri-n-butylamine as curing agents therein.

These and other objects as shall appear are fulfilled by the present invention in a manner readily discerned from the following detailed description when read in conjunction with the accompanying drawing illustrating an embodiment of the present invention.

In accordance with the practice of this invention (as generally depicted in the flow diagram of Table I), the described improvements are achieved by the fabrication of a tape with a base 10 formed of a continuous yarn Fiberglas cloth. Fiberglas cloth is commercially available in a wide variety of gauges and thread counts, and it can be chosen to suit the particular use to which the tape shall be put.

The Fiberglas cloth backing is coated upon one of its planar surfaces with a thin layer 12 of a base coat adhesive consisting essentially of a silicone resin, that is, an organo silicon polymer identified as a mixture comprising principally methyl, phenyl, and methyl-phenyl polysiloxanes in which the number of hydrolyzable groups in the silane are sufficient upon polymerization by condensation to form a resin having the characteristics of an elastomer with adhesive and cohesive properties upon cure. Suitable organo silicon polymers for use in the practice of this invention include those made and sold by the Dow-Corning Corporation, Midland, Michigan, and set forth in Table II:

TABLE II

| Properties | Dow-Corning Trade Designation | | |
| --- | --- | --- | --- |
| | C-269 | C-271 | C-274 |
| Solids Content, percent [1] | 36-38 | 36-38 | 60-62 |
| Viscosity at 25 C., centipoises | 1,000-5,000 | 3,000-8,000 | 80,000-180,000 |
| Specific gravity at 25 C | 0.94 | 0.94 | 0.97 |
| Flash point (° F.) | 70-100 | 70-100 | 70-100 |
| Solvent | Xylene | Xylene | Xylene |

[1] Determined according to ASTM D1346-54T, 3 hours at 135° C.

In addition to a silicone resin, the base coat of the present invention further contains from 0.5 to 5 parts by weight of benzoyl peroxide per 100 parts resin as a curing agent which further resists the cold flow of the base coat into the interstices of the backing. While benzoyl peroxide is the preferred cure for this formulation, 2,4-dichlorobenzoyl peroxide and tertiary butyl perbenzoate are found to give quite satisfactory results with backings of high strand density. The base coat further contains up to about 30 parts by weight per 100 parts resin of a filler such for example as hydrated alumina, titanium dioxide, zinc oxide, calcium carbonate, asbestos and like materials capable of withstanding temperatures up to about 1000° F. without decomposing or melting, and an inert diluent such, for example, as toluol, heptane, xylene, benzoyl, and the like, in a sufficient quantity to give the desired consistency to the formulation according to the coating method selected.

To aid in the fuller understanding of the present invention, the following formulations represent base coat adhesives which may be employed in the practice of this invention.

Example 1
| Constituent: | Parts by weight |
| --- | --- |
| Silicone resin | 100 |
| Hydrated alumina | 4 |
| Benzoyl peroxide | 0.5 |
| Toluol | 10 |

Example 2
| Constituent: | Parts by weight |
| --- | --- |
| Silicone resin | 100 |
| Titanium dioxide | 15 |
| Benzoyl peroxide | 3 |
| Toluol | 20 |

Example 3
| Constituent: | Parts by weight |
| --- | --- |
| Silicone resin | 100 |
| Asbestos | 8 |
| Hydrated alumina | 10 |
| Benzoyl peroxide | 3.5 |
| Heptane | 24 |

Example 4
| Constituent: | Parts by weight |
| --- | --- |
| Silicone resin | 100 |
| Zinc oxide | 22 |
| 2,4-dichlorobenzoyl peroxide | 5 |
| Xylene | 25 |

Example 5
| Constituent: | Parts by weight |
| --- | --- |
| Silicone resin | 100 |
| Calcium carbonate | 5 |
| Hydrated alumina | 12 |
| Benzoyl peroxide | 0.9 |
| Toluol | 55 |

In the fabrication of a tape embodying this invention the base coat adhesive is preferably knife coated onto the backing to provide a dry coating weight of about 8 to about 50 pounds per ream. Brush coating, roller coating and other known methods of coating may be used if desired.

When the base coat has been uniformly disposed upon the backing, the coated backing is heated in a drying oven or like furnace to drive off the solvent. Drying the coated backing for about 1 to 5 minutes at a temperature of approximately 140-180° F. is usually sufficient to dry the base coat to its desired conditions.

When the base coat 12 is sufficiently dried, that is, when substantially all excess solvent has been dispelled therefrom, the base coat is prepared for the application of a second or top coat adhesive 14.

The top coat adhesive 14 of this invention, like the base coat 12, comprises a formulation containing a silicone resin of the type previously described and exemplified in Table II. Our top coat further contains, in parts by weight per 100 parts resin, from 0.5 to about 5 parts of a special curing agent consisting of tri-n-butylamine, and a sufficient quantity of an inert diluent such, for example, as toluol, heptane, xylene and benzol to give the formulation its desired consistency for coating in any of the manners previously described.

To aid in the fuller understanding of the present invention, the following formulations represent top coat adhesives which may be employed in the practice of this invention.

Example 6
| Constituent: | Parts by weight |
| --- | --- |
| Silicone resin | 100 |
| Tri-n-butylamine | 0.5 |
| Toluol | 4 |

Example 7
| Constituent: | Parts by weight |
| --- | --- |
| Silicone resin | 100 |
| Tri-n-butylamine | 2 |
| Heptane | 3 |

Example 8
| Constituent: | Parts by weight |
| --- | --- |
| Silicone resin | 100 |
| Tri-n-butylamine | 5 |
| Toluol | 12 |

Example 9
| Constituent: | Parts by weight |
| --- | --- |
| Silicone resin | 100 |
| Tri-n-butylamine | 0.6 |
| Benzol | 5 |

Example 10
| Constituent: | Parts by weight |
| --- | --- |
| Silicone resin | 100 |
| Tri-n-butylamine | 1.5 |
| Xylene | 7 |

When the top coat adhesive has been uniformly coated over the dried base coat, the coated backing is placed in a drying oven or like furnace to dispel the excess solvent from the top coat. Next, the entire adhesive mass is cured for a time and at a temperature equal to or the correlated equivalent of 3 minutes at 350° F. The tape is cooled and ready for the trade either as sheets or rolls cut to a desired size.

Upon curing, the top coat adhesive containing tri-n-butylamine as a cure has good tack and adhesion properties and retains its good adhesion at both the extremely high and the extremely low temperatures herein described. Thus, a pressure-sensitive adhesive tape is provided which fulfills the aforestated objects even beyond expectation.

It is, of course, understood that the principal concepts of the present invention, while described in connection with the fabrication of pressure-sensitive adhesive tapes, are not necessarily limited thereto. For example, it is contemplated that the adhesive formulations of the present invention may also be applied to backings of metallic foil, polyester films and such other materials which resist high and low temperature degradation or embrittlement. And while certain exemplary embodiments have been herein described, they are presented to define, not to limit, the present invention, and such applications and modifications of the structures, materials and procedures herein described as may be readily apparent to those skilled in the art are within the spirit of the present invention, especially as it is defined in the following claims.

What is claimed is:

1. An article of manufacture comprising a thermally stable heat-resistant backing formed of a material selected from the group consisting of fiberglass cloth, metallic foils, and polyester films, a first layer adherently formed upon said backing in surface engagement therewith from the heat cured product of a first formulation containing silicone resin formed of a mixture of methyl, phenyl and methyl phenyl polysiloxane with sufficient cross linkages to embody elastomeric properties when cured, and a filler as its essential ingredients, and a second layer adherently formed upon said first layer in surface engagement therewith consisting of the normally tacky pressure-sensitive heat cured product of a second formulation containing silicone resin formed of a mixture of methyl, phenyl and methyl phenyl polysiloxane with sufficient cross linkages to embody elastomeric properties when cured and tri-n-butylamine as its essential ingredients, said amine being present by weight in 0.5 to 5 parts per 100 parts of said resin and a peroxide curing agent present only in the first layer and in which the peroxide is present in an amount within the range of 0.5 to 5 parts by weight per 100 parts by weight of the resin.

2. An article of manufacture comprising a backing of continuous yarn glass fiber cloth; an intermediate coating adherently disposed upon said backing comprising the product formed by heat curing a formulation consisting by weight of 100 parts of an organosilicon polymeric resin formed of a mixture of methyl, phenyl and methyl phenyl polysiloxane with sufficient cross linkages to embody elastomeric properties when cured, from 0.5 to 5 parts of a peroxide curing agent, up to 30 parts of a filler selected from the group consisting of titanium dioxide, hydrated alumina, zinc oxide, silicon oxide, asbestos, and calcium carbonate and a sufficient amount of a substantially evanescent inert diluent to render the formulation workable for coating upon said backing; and a top coating adherently disposed upon said intermediate coating and comprising the normally tacky pressure-sensitive product formed by heat curing a formulation consisting by weight of 100 parts of an organosilicon polymeric resin formed of a mixture of methyl, phenyl and methyl phenyl polysiloxane with sufficient cross linkages to embody elastomeric properties when cured, from 0.5 to 5 parts of tri-n-butylamine, and a sufficient amount of an inert diluent to render the formulation workable for coating upon said intermediate layer.

3. The method of fabricating a pressure-sensitive adhesive product from a sheet of material characterized by its resistance to high and low temperature degradation and embrittlement comprising coating a sheet of the material with a first formulation consisting by weight of 100 parts silicone resin formed of a mixture of methyl, phenyl and methyl phenyl polysiloxane with sufficient cross linkages to embody elastomeric properties when cured, from 0.5 to 5 parts benzoyl peroxide, 1 to 30 parts filler and sufficient inert diluent to render the formulation workable for coating; drying said coated sheet to dispel said diluent from said first formulation; coating said dried coated sheet with a second formulation consisting by weight of 100 parts silicone resin formed of a mixture of methyl, phenyl and methyl phenyl polysiloxane with sufficient cross linkages to embody elastomeric properties when cured, 0.5 to 5 parts tri-n-butylamine, and sufficient inert diluent to render the formulation workable for coating; drying said twice-coated sheet to dispel said diluent from said second formulation; and heat curing said twice-coated dried sheet for a time and at a temperature to provide a state of cure corresponding to heating said sheet at a temperature of about 350° F. for 3 minutes.

4. The method of fabricating a pressure-sensitive adhesive product comprising: coating a sheet of a continuous yarn fiberglass cloth with a first formulation consisting by weight of 100 parts of an organosilicon polymeric resin formed of a mixture of methyl, phenyl and methyl phenyl polysiloxane with sufficient cross linkages to embody elastomeric properties when cured, from 0.5 to 5 parts benzoyl peroxide, up to 30 parts of a filler selected from the group consisting of titanium dioxide, hydrated alumina, zinc oxide, silicon oxide, asbestos and calcium carbonate, and a sufficient amount of an inert diluent to render the formulation workable for coating; drying said coated sheet to dispel said diluent from said first formulation; coating said dried coated sheet with a second formulation consisting by weight of an organosilicon polymeric resin formed of a mixture of methyl, phenyl and methyl phenyl polysiloxane with sufficient cross linkages to embody elastomeric properties when cured, from 0.5 to 5 parts tri-n-butylamine, and a sufficient amount of an inert diluent to render the formulation workable for coating; drying said twice-coated sheet to dispel said diluent from said second formulation; and heat curing said twice-coated, twice-dried sheet for a time and at a temperature to provide a state of curing corresponding to heating said sheet for 3 minutes at a temperature of about 350° F.

5. The method of fabricating a pressure-sensitive adhesive product from a sheet of continuous yarn glass fiber cloth comprising coating a sheet of the material with a first formulation consisting by weight of 100 parts silicone resin formed of a mixture of methyl, phenyl and methyl phenyl polysiloxane with sufficient cross linkages to embody elastomeric properties when cured, from 0.5 to 5 parts benzoyl peroxide, 1 to 30 parts filler and sufficient inert diluent to render the formulation workable for coating; drying said coated sheet to dispel said diluent from said first formulation; coating said dried coated sheet with a second formulation consisting by weight of 100 parts silicone resin formed of a mixture of methyl, phenyl and methyl phenyl polysiloxane with sufficient cross linkages to embody elastomeric properties when cured, 0.5 to 5 parts tri-n-butylamine, and sufficient inert diluent to render the formulation workable for coating; drying said twice-coated sheet to dispel said diluent from said second formulation; and heat curing said twice-coated, twice-dried sheet at a temperature of about 350° F. for 3 minutes.

6. The method of fabricating a thermally stable, flexible, heat-resistant, pressure-sensitive adhesive product comprising successively coating a thermally stable, flexible, heat-resistant backing with first and second silicon resin formulations formed of a mixture of methyl, phenyl and methyl phenyl polysiloxane with sufficient cross linkages to embody elastomeric properties when cured, said formulations containing a cure and a heat-displaceable inert diluent to provide a first and second coating on the backing, heating the first coating to displace the diluent and dry the coating and then heating the second coating as it is applied to displace the diluent and dry the coating, and then heating the composite to a a temperature in excess of 350° F. to cure, curing the silicone resins, said cure in said first formulation being a peroxide and said cure in said second formulation being tri-n-butylamine.

7. An article of manufacture comprising a thermally stable, heat-resistant backing, a first layer adherently formed upon said backing in surface engagement therewith from the heat cured product of a first formulation containing silicone resin, formed of a mixture of methyl, phenyl, and methyl phenyl polysiloxane with sufficient cross linkages to embody elastomeric properties when cured, and a filler as its essential ingredients, and a second layer adherently formed upon said first layer in surface engagement therewith consisting of the normally tacky pressure-sensitive heat cured product of a second formulation containing silicone resin, formed of a mixture of methyl, phenyl, and methyl phenyl polysiloxane with sufficient cross linkages to embody elastomeric properties when cured, and tri-n-butylamine as its essential ingredients, said tri-n-butylamine being present by weight in 0.5 to 5 parts per 100 parts of said resin and a peroxide curing agent present only in the first layer and in which the peroxide is present in an amount within the range of 0.5 to 5 parts by weight per 100 parts by weight of the resin.

8. An article of manufacture comprising a backing of continuous yarn fiberglass cloth; an intermediate coating adherently disposed upon said backing comprising the product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a peroxide curing agent, up to 30 parts of a filler selected from the group consisting of titanium dioxide, hydrated alumina, zinc oxide, silicon oxide, asbestos, and calcium carbonate and a sufficient amount of a substantially evanescent inert diluent to render the formulation workable for coating upon said backing; and a top coating adherently disposed upon said intermediate coating and comprising the normally tacky pressure-sensitive product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a curing agent comprising tri-n-butylamine, and a sufficient amount of an inert diluent to render the formulation workable for coating upon said intermediate layer.

9. A method of fabricating a thermally stable, flexible, heat-resistant, pressure-sensitive adhesive product comprising successively coating a thermally stable, flexible, heat-resistant backing with first and second silicone resin formulation, formed of a mixture of methyl, phenyl, and methyl phenyl polysiloxane with sufficient cross linkages to embody elastomeric properties when cured, said formulations containing a curing agent and a heat-displaceable inert diluent to provide a first and second coating on the backing, heating the first coating to displace the diluent and dry the coating, then heating the second coating as it is applied to displace the diluent and dry the coating, and then heating the composite to a temperature in excess of 350° F. to cure the silicone resin, said curing agent in said first formulation being a peroxide and said curing agent in said second formulation being tri-n-butylamine.

10. An article of manufacture comprising a thermally stable heat-resistant backing, a first layer adherently formed upon said backing in surface engagement therewith from the heat cured product of a first formulation containing silicone resin, formed of a mixture of methyl, phenyl, and methyl phenyl polysiloxane with sufficient cross linkages to embody elastomeric properties when cured, and a filler as its essential ingredients, and a second layer adherently formed upon said first layer in surface engagement therewith consisting of the normally tacky pressure-sensitive heat cured product of a second formulation containing silicone resin, formed of a mixture of methyl, phenyl, and methyl phenyl polysiloxane with sufficient cross linkages to embody elastomeric properties when cured, and tri-n-butylamine as its essential ingredients, said tri-n-butylamine being present by weight in 0.5 to 5 parts per 100 parts of said resin and a peroxide curing agent selected from the group consisting of benzoyl peroxide, 4,4-dichloro benzoyl peroxide, and tertiary butyl perbenzoate present only in the first layer and in an amount within the range of 0.5 to 5 parts by weight per 100 parts by weight of the resin.

11. An article of manufacture comprising a backing of continuous yarn fiberglass cloth; an intermediate coating adherently disposed upon said backing comprising the product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a peroxide curing agent selected from the group consisting of benzoyl peroxide, 2,4-dichloro benzoyl peroxide, and tertiary butyl perbenzoate, up to 30 parts of a filler selected from the group consisting of titanium dioxide, hydrated alumina, zinc oxide, silicon oxide, asbestos, and calcium carbonate and a sufficient amount of a substantially evanescent inert diluent to render the formulation workable for coating upon said backing; and a top coating adherently disposed upon said intermediate coating and comprising the normally tacky pressure-sensitive product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a curing agent comprising tri-n-butylamine, and a sufficient amount of an inert diluent to render the formulation workable for coating upon said intermediate layer.

12. A method of fabricating a thermally stable, flexible, heat-resistant, pressure-sensitive adhesive product comprising successively coating a thermally stable, flexible, heat-resistant backing with first and second silicone resin formulations, formed of a mixture of methyl, phenyl, and methyl phenyl polysiloxane with sufficient cross linkages to embody elastomeric properties when cured, said formulations containing a curing agent and a heat-displaceable inert diluent to provide a first and second coating on the backing, heating the first coating to displace the diluent and dry the coating, then heating the second coating as it is applied to displace the diluent and dry the coating, and then heating the composite to a temperature in excess of 350° F. to cure the silicone resin, said curing agent in said first formulation being a peroxide selected from the group consisting of benzoyl peroxide, 2,4-dichloro benzoyl peroxide, and tertiary butyl perbenzoate and said curing agent in said second formulation being tri-n-butylamine.

13. An article of manufacture comprising a thermally stable heat-resistant backing, a first layer adherently formed upon said backing in surface engagement therewith from the heat cured product of a first formulation containing silicone resin, formed of a mixture of methyl, phenyl, and methyl phenyl polysiloxane with sufficient cross linkages to embody elastomeric properties when cured, and a filler as its essential ingredients, and a second layer adherently formed upon said first layer in surface engagement therewith consisting of the normally tacky pressure-sensitive heat cured product of a second formulation containing silicone resin, formed of a mixture of methyl, phenyl, and methyl phenyl polysiloxane with sufficient cross linkages to embody elastomeric properties when cured, and tri-n-butylamine as its essential ingredients, said tri-n-butylamine being present by weight in 0.5 to 5 parts per 100 parts of said resin and a benzoyl peroxide curing agent present only in the first layer and in which the peroxide is present in an amount within the range of 0.5 to 5 parts by weight per 100 parts by weight of the resin.

14. An article of manufacture comprising a backing of continuous yarn fiberglass cloth; an intermediate coating adherently disposed upon said backing comprising the product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a benzoyl peroxide curing agent, up to 30 parts of a filler selected from the group consisting of titanium dioxide, hydrated alumina, zinc oxide, silicon oxide, asbestos, and calcium carbonate and a sufficient amount of a substantially evanescent inert diluent to render the formulation workable for coating upon said backing; and a top coating adherently disposed upon said intermediate coating and comprising the normally tacky pressure-sensitive product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a curing agent comprising tri-n-butylamine, and a sufficient amount of an inert diluent to render the formulation workable for coating upon said intermediate layer.

15. A method of fabricating a thermally stable, flexible, heat-resistant, pressure-sensitive adhesive product comprising successively coating a thermally stable, flexible, heat-resistant backing with first and second silicone resin formulations, formed of a mixture of methyl, phenyl, and methyl phenyl polysiloxane with sufficient cross linkages to embody elastomeric properties when cured, said formulations containing a curing agent and a heat-displaceable inert diluent to provide a first and second coating on the backing, heating the first coating to displace the diluent and dry the coating, then heating the second coating as it is applied to displace the diluent and dry the coating, and then heating the composite to a temperature in excess of 350° F. to cure the silicone resin, said curing agent in said first formulation being benzoyl peroxide and said curing agent in said second formulation being tri-n-butylamine.

16. An article of manufacture comprising a thermally stable, heat-resistant backing, a first layer adherently formed upon said backing in surface engagement therewith from the heat cured product of a first formulation containing silicone resin, formed of a mixture of methyl, phenyl, and methyl phenyl polysiloxane with sufficient cross linkages to embody elastomeric properties when cured, and a filler as its essential ingredients, and a second layer adherently formed upon said first layer in surface engagement therewith consisting of the normally tacky pressure-sensitive heat cured product of a second formulation containing silicone resin, formed of a mixture of methyl, phenyl, and methyl phenyl polysiloxane with sufficient cross linkages to embody elastomeric properties when cured, and tri-n-butylamine as its essential ingredients, said tri-n-butylamine being present by weight in 0.5 to 5 parts per 100 parts of said resin and a 2,4-dichloro benzoyl peroxide curing agent present only in the first layer and in which the peroxide is present in an amount within the range of 0.5 to 5 parts by weight per 100 parts by weight of the resin.

17. An article of manufacture comprising a backing of continuous yarn fiberglass cloth; an intermediate coating adherently disposed upon said backing comprising the product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a 2,4-dichloro benzoyl peroxide curing agent, up to 30 parts of a filler selected from the group consisting of titanium dioxide, hydrated alumina, zinc oxide, silicon oxide, asbestos, and calcium carbonate and a sufficient amount of a substantially evanescent inert diluent to render the formulation workable for coating upon said backing; and a top coating adherently disposed upon said intermediate coating and comprising the normally tacky pressure-sensitive product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a curing agent comprising tri-n-butylamine, and a sufficient amount of an inert diluent to render the formulation workable for coating upon said intermediate layer.

18. A method of fabricating a thermally stable, flexible, heat-resistant, pressure-sensitive adhesive product comprising successively coating a thermally stable, flexible, heat-resistant backing with first and second silicone resin formulations, formed of a mixture of methyl, phenyl, and methyl phenyl polysiloxane with sufficient cross linkages to embody elastomeric properties when cured, said formulations containing a curing agent and a heat-displaceable inert diluent to provide a first and second coating on the backing, heating the first coating to displace the diluent and dry the coating, then heating the second coating as it is applied to displace the diluent and dry the coating, and then heating the composite to a temperature in excess of 350° F. to cure the silicone resin, said curing agent in said first formulation being 2,4-dichloro benzoyl peroxide and said curing agent in said second formulation being tri-n-butylamine.

19. An article of manufacture comprising a thermally stable, heat-resistant backing, a first layer adherently formed upon said backing in surface engagement therewith from the heat cured product of a first formulation containing silicone resin, formed of a mixture of methyl, phenyl, and methyl phenyl polysiloxane with sufficient cross linkages to embody elastomeric properties when cured, and a filler as its essential ingredients, and a second layer adherently formed upon said first layer in surface engagement therewith consisting of the normally tacky pressure-sensitive heat cured product of a second formulation containing silicone resin, formed of a mixture of methyl, phenyl, and methyl phenyl polysiloxane with sufficient cross linkages to embody elastomeric properties when cured, and tri-n-butylamine as its essential ingredients, said tri-n-butylamine being present by weight in 0.5 to 5 parts per 100 parts of said resin and a tertiary butyl perbonzoate curing agent present only in the first layer and in which the tertiary butyl perbenzoate is present in an amount within the range of 0.5 to 5 parts by weight per 100 parts by weight of the resin.

20. An article of manufacture comprising a backing of continuous yarn fiberglass cloth; an intermediate coating adherently disposed upon said backing comprising the product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a tertiary butyl perbenzoate curing agent, up to 30 parts of a filler selected from the group consisting of titanium dioxide, hydrated alumina, zinc oxide, silicon oxide, asbestos, and calcium carbonate and a sufficient amount of a substantially evanescent inert diluent to render the formulation workable for coating upon said backing; and a top coating adherently disposed upon said intermediate coating and comprising the normally tacky pressure-sensitive product formed by heat curing a formulation consisting by weight of 100 parts of an organosilicon polymeric resin, formed of a mixture of methyl, phenyl, and methyl phenyl polysiloxane with sufficient cross linkages to embody elastomeric properties when cured, from 0.5 to 5 parts of a curing agent comprising tri-n-butylamine, and a sufficient amount of an inert diluent to render the formulation workable for coating upon said intermediate layer.

21. A method of fabricating a thermally stable, flexible, heat-resistant, pressure-sensitive adhesive product comprising successively coating a thermally stable, flexible, heat-resistant backing with first and second silicone resin formulation, formed of a mixture of methyl, phenyl, and methyl phenyl polysiloxane with sufficient cross linkages to embody elastomeric properties when cured, said formulations containing a curing agent and a heat-displaceable inert diluent to provide a first and second coating on the backing, heating the first coating to displace the diluent and dry the coating, then heating the second coating as it is applied to displace the diluent and dry the coating, and then heating the composite to a temperature in excess of 350° F. to cure the silicone resin, said curing agent in said first formulation being tertiary butyl perbenzoate and said curing agent in said second formulation being tri-n-butylamine.

References Cited in the file of this patent

UNITED STATES PATENTS

| | | |
|---|---|---|
| 2,637,623 | James | May 5, 1953 |
| 2,713,564 | Pfeifer et al. | July 19, 1955 |
| 2,732,318 | Keil | Jan. 24, 1956 |
| 2,758,127 | Goldschmidt et al. | Aug. 7, 1956 |
| 2,833,742 | Koch | Mar. 6, 1958 |
| 2,842,520 | Polmanteen et al. | July 8, 1958 |
| 2,902,389 | Keil | Sept. 1, 1959 |
| 2,930,106 | Wrotnowski | Mar. 29, 1960 |